(No Model.)
S. E. MOWER & T. FOWLER.
METHOD OF TEMPERING METAL BANDS OR STRIPS.
No. 337,978. Patented Mar. 16, 1886.
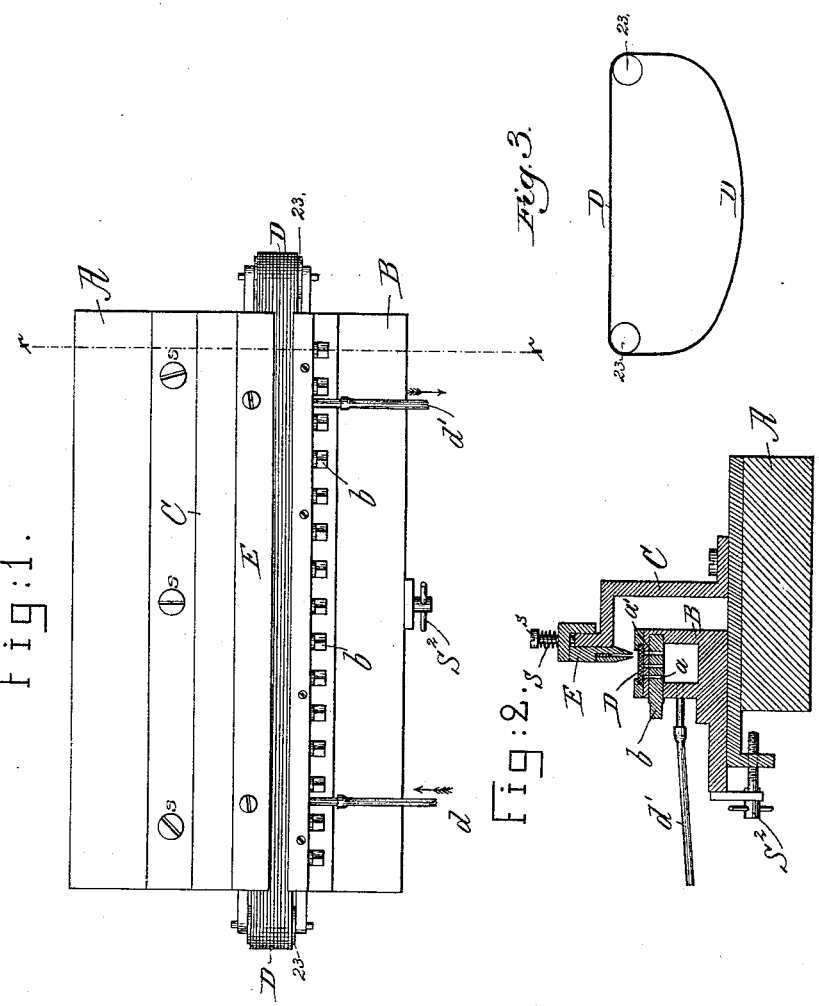
Witnesses.
Inventors.

UNITED STATES PATENT OFFICE.

SAMUEL E. MOWER AND THADDEUS FOWLER, OF NEW HAVEN, ASSIGNORS TO HENRY G. THOMPSON, OF MILFORD, AND HARRY G. THOMPSON, OF NEW HAVEN, CONN., AND ARTHUR G. THOMPSON, OF NEW YORK, N. Y.

METHOD OF TEMPERING METAL BANDS OR STRIPS.

SPECIFICATION forming part of Letters Patent No. 337,978, dated March 16, 1886.

Application filed August 31, 1885. Serial No. 175,730. (No model.)

*To all whom it may concern:*

Be it known that we, SAMUEL E. MOWER and THADDEUS FOWLER, both of New Haven, county of New Haven, and State of Connecticut, have invented an Improvement in Methods of Tempering Metal Strips or Bands, of which the following description, in connection with the accompanying drawings, is a specification, like letters on the drawings representing like parts.

This invention has for its object to temper one edge of a metal strip or blank—as, for instance, a toothed strip or blank substantially such as described in the application of Thaddeus Fowler—suitable for saws.

Our invention consists, essentially, in an improved method of tempering one edge of a metal strip, which comprehends drawing or moving the edge of the said metal strip across a wet or moistened absorbent material or medium, shown as a band, which thus cools one edge only of the said strip, thus hardening the same, as will be described.

To practice our invention, a reservoir or tank containing water or other usual tempering-fluid is provided with a band of an absorbent or liquid-holding material, herein shown as composed of canvas, with which the teeth of the saw are made to come in contact.

The reservoir referred to is provided with an inlet-pipe to supply it with water, and with an outlet-pipe to conduct the water from the reservoir, thus enabling a constant supply of cold water to be kept in the said reservoir, the latter having a series of cocks, each of which is herein shown as provided with a series of outlets, affording ready access for the water to the absorbent band. The teeth of the strip or blank engage the absorbent band as the said strip or blank is drawn through the tempering or hardening apparatus, thereby enabling the water in the said band to come in contact with only one edge of the said metal strip, thus confining the temper to that part of the metal strip which is brought in contact with the absorbent medium.

Figure 1 is a plan view of a tempering apparatus by which our invention may be practiced; Fig. 2, a section of Fig. 1 in the dotted line *x x;* and Fig. 3, on a small scale, shows the endless absorbent material or band removed.

The bed A, of suitable shape and strength to sustain the working parts, supports the reservoir B, provided at its upper face with openings $a'$, co-operating with similar openings or outlets, $a$, of a series of cocks, $b$, arranged in the reservoir, as shown in Fig. 1.

The sides of the reservoir B are herein shown as extended upward, so as to form a groove or guideway for the reception of the absorbent medium or material D, which comes in contact with the toothed edge of the strip or blank, which may be a saw or other metal piece to be tempered, the absorbent material being preferably a strip of canvas made as an endless band, as shown in Fig. 3, the said band (see Fig. 1) being supported by rollers 23 23, the band being moved in its guideways by means of the strip or blank engaging it.

The bed A has secured to it a standard, C, which supports the guide E for the upper edge of the strip or blank or the saw or other metal piece to be tempered along its lower edge, a spring, S, placed between the head of a screw, $s$, and the top of the guide E, acting to keep the saw or other metal piece down in contact with the absorbent material or medium D.

The reservoir B can be adjusted upon the bed A by the screw $S^2$, so as to present a new part of the absorbent material D to the metal when one part of the former has become worn or cut or otherwise rendered unfit for use. The pipe $d$ supplies water to the reservoir, while the pipe $d'$ (see Fig. 1) serves as an outlet for the same, thereby affording means for maintaining a circulation of cool water in the reservoir at all times.

In practice the band D may be moved by the engagement with it of the teeth of the strip or blank, and it is obvious that the absorbent band may be revolved by suitable machinery in case the article to be tempered is devoid of teeth.

We do not limit ourselves to any special form of apparatus for maintaining the absorbent band in contact with the metal.

We do not herein claim a process of tempering wherein one edge or end of the metal is thrust more or less into water or other tempering-fluid, for that is old, and by such plan it would not be possible to temper only one edge of the strip or blank or saw and leave the opposite edge soft or unhardened, for water touching the hot metal would be caught up quickly by the same and produce its effect for a considerable distance into the metal, whereas by limiting the amount of water which may be taken up, and compelling the metal to take it from the absorbent material or medium, thus limiting the amount of water that may be taken up, and also its rate with relation to the rate of travel of the metal, it is possible to regulate the quantity of water which may be taken up by the heated or hot metal, and consequently the depth of the hardening.

We claim—

The herein-described method of hardening and tempering one edge of a metal strip or blank, which consists in drawing or passing the edge to be hardened against a wet or moistened absorbent strip, substantially as described.

In testimony whereof we have signed our names to this specification in the presence of two subscribing witnesses.

SAMUEL E. MOWER.
   THADDEUS FOWLER.

Witnesses:
 HENRY G. THOMPSON,
 TH. B. CANNON.